(12) United States Patent
Gävert et al.

(10) Patent No.: US 9,814,000 B2
(45) Date of Patent: Nov. 7, 2017

(54) RECEIVER OVERLOAD PROTECTION

(71) Applicant: TELEFONAKTIEBOLAGET LM ERICSSON (PUBL), Stockholm (SE)

(72) Inventors: Björn Gävert, Göteborg (SE); Göran Nilsson, Hisings Backa (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/034,332

(22) PCT Filed: Nov. 12, 2013

(86) PCT No.: PCT/EP2013/073626
§ 371 (c)(1),
(2) Date: May 4, 2016

(87) PCT Pub. No.: WO2015/070895
PCT Pub. Date: May 21, 2015

(65) Prior Publication Data
US 2016/0295528 A1 Oct. 6, 2016

(51) Int. Cl.
*H04W 52/34* (2009.01)
*H04W 52/24* (2009.01)
*H04B 17/29* (2015.01)
*H04W 52/28* (2009.01)

(52) U.S. Cl.
CPC .......... *H04W 52/343* (2013.01); *H04B 17/29* (2015.01); *H04W 52/245* (2013.01); *H04W 52/28* (2013.01)

(58) Field of Classification Search
CPC .......................... H04W 52/343; H04W 52/245
USPC ............ 455/522, 69, 452.1, 509, 501, 67.13
See application file for complete search history.

(56) References Cited

U.S. PATENT DOCUMENTS

| 5,333,175 A * | 7/1994 | Ariyavisitakul ...... H04W 52/12 370/311 |
| 7,647,062 B2 * | 1/2010 | Makinen ............... H04W 52/24 370/318 |
| 2004/0063412 A1 | 4/2004 | Kim et al. |

FOREIGN PATENT DOCUMENTS

| EP | 1 684 437 A1 | 7/2006 |
| WO | WO 00/44107 A2 | 7/2000 |
| WO | WO 03/034639 A1 | 4/2003 |

* cited by examiner

Primary Examiner — John J Lee (57) ABSTRACT

A method in a fixed point-to-point radio link transceiver. The method comprising the steps of receiving a first signal from a far end transceiver, and detecting receiver overload due to excess power in the received first signal, and also transmitting a second signal to the far end transceiver. The step of transmitting comprising including, in the second signal, a request to reduce transmission power in the far end transceiver when receiver overload is detected.

14 Claims, 4 Drawing Sheets

RECEIVER OVERLOAD PROTECTION

TECHNICAL FIELD

The present disclosure relates to a method and a transceiver for fixed point-to-point radio communication.

BACKGROUND

A fixed point-to-point radio link is a two-way communication system designed for communication between two fixed locations, each location comprising at least a transmitter unit and receiver unit, i.e., a transceiver. The transceiver is often equipped with, or connectable to, at least one antenna. Fixed point-to-point radio links are commonly deployed in networks for cellular backhaul, and are therefore often subject to strict requirements on performance, e.g., in terms of allowed bit error rate and link availability. This complicates the design of transceivers for fixed point-to-point radio links compared to, e.g., design of transceivers used for cellular access, which have different requirements on availability and bit error rates.

A receiver in a fixed point-to-point radio link transceiver generally comprises non-linear components such as low noise amplifiers and mixers. These components will add non-linear distortion to a received signal. The amount of non-linear distortion added depends, among other things, on the input signal level to the non-linear elements. This is especially true when the input signal level surpasses a saturation level of a non-linear component, in which case a large amount of signal distortion can be expected to occur in the received signal. It is therefore crucial to avoid saturating any of the non-linear elements in a transceiver, and to keep input signal levels below the saturation level of the receiver at all times.

Receiver non-linearity can be alleviated by designing power amplifiers with higher saturation level. This will however lead to a less power efficient system and can also affect the receiver noise figure in a negative way. Thus, analogue receivers with high linearity often suffer from high power consumption and a sub-optimal noise performance, which is a drawback in many fixed point-to-point radio links.

Receiver non-linearity can also be alleviated by using linearization techniques at the receiver. Receiver linearization can be analogue, but a more common solution is digital linearization. Most linearization techniques, however, introduce complexity into the communication system. Thus, a system using digital linearization techniques often suffers from high system complexity, which is a drawback in many fixed point-to-point radio links.

The dynamic range of a receiver is characterized by the difference between the receiver noise floor and the receiver saturation level, this dynamic range should be as large as possible in order to ensure good transceiver performance. The receiver noise figure determines the level of the receiver noise floor, the larger the noise figure, the higher the noise floor level.

The upper limit of the dynamic range, i.e. the receiver saturation level, can be improved by increasing the power consumption in the receiver. Hence, by using, e.g., power amplifiers with increased saturation level the receiver can tolerate higher input signal levels. This however leads to less power efficient solutions, which is a drawback.

The radio propagation channel over the radio link between a transmitter and a far end receiver often includes fading phenomena. This fading alters the attenuation which affects a transmitted radio signal. Fading caused by, e.g., rain and multipath propagation usually results in increased channel attenuation. This type of fading therefore decreases the input power in a receiver, and is usually referred to as down fading.

Other types of fading include ducting, where the radio propagation channel forms a wave guide. This phenomenon decreases the attenuation of the radio propagation channel, and results in increased received power at a receiver. Phenomena such as ducting are commonly referred to as up fading.

When installing a fixed point-to-point radio link all the aspects described above, i.e., receiver dynamic range and varying radio channel attenuation due to both down and up fading, will limit the radio link hop distance. This is because a certain fade margin must be applied to the radio link budget due to rain and multipath fading. The receiver dynamic range, or rather the saturated power level of the receiver and receiver noise floor, will however limit the amount of fade margin that can be used.

SUMMARY

An object of the present disclosure is to provide a method and a transceiver which seek to mitigate, alleviate, or eliminate one or more of the above-identified deficiencies in the art and disadvantages singly or in any combination and to provide an improved receiver overload protection for a fixed point-to-point radio link.

This object is obtained by a method in a fixed point-to-point radio link transceiver. The method comprises the step of receiving a first signal from a far end transceiver, and detecting receiver overload due to excess power in the received first signal. The method also comprises the step of transmitting a second signal to the far end transceiver, the step of transmitting comprising including, in the second signal, a request to reduce transmission power in the far end transceiver when receiver overload is detected.

By requesting a decrease of the far end transceiver output power when receiver overload is detected at the transceiver, driving of the transceiver into saturation can be avoided. This method of avoiding receiver overload brings many benefits and advantages which are especially relevant for fixed point-to-point radio link transceivers, and especially long distance fixed point-to-point radio links which require large fading margins.

For instance linearity requirements on the analogue front-end of the transceiver are relaxed, which is an advantage. Consequently, since analogue receivers do not need very strict requirements on linearity, both power consumption and noise figure can be improved.

A further advantage obtained is an improvement of the overall noise figure of the transceiver since the analogue front-end can be optimized for minimum noise, leading to an increased dynamic range of the receiver.

Yet another advantage is that the introduction of radio technologies which are known to suffer from a lower saturated output power than conventional technologies, but often have a large advantage in terms of cost, i.e., based on Silicon-Germanium, SiGe, technologies, are enabled by the above disclosed method.

Further, if the analogue front-end of the transceiver is not driven into its nonlinear region, there will be no need for implementing receiver linearization techniques in the transceiver. This is an advantage since system complexity is reduced.

According to one aspect, the step of detecting also comprises measuring the power of the received first signal and comparing the measured power of the first signal to a pre-configured first signal power threshold.

Thus, reliable and real-time detection of receiver overload is achieved without the addition of significant complexity to the receiver, which is an advantage.

According to another aspect, the step of detecting further comprises demodulating the received first signal followed by detecting modulated information symbols comprised in the first signal, and also determining an error signal. The error signal is determined as the difference between the demodulated information symbols and the corresponding samples of the received and demodulated first signal. The step of detecting also comprises comparing the correlation between the magnitude of the error signal and the magnitude of the first signal to a pre-determined first signal error correlation threshold.

By the above disclosed feature of demodulating the received first signal and generating an error signal, and basing the step of detection on said error signal, only receiver overload conditions which actually affect the end operating performance of the transceiver, in terms of reduced quality of the demodulated information symbols, triggers a request for reduced transmission power. This is an advantage since it can be expected to further improve the receiver overload protection of the transceiver in that reduced transmission power is only requested when receiver performance is actually jeopardized, and not before, thus allowing to maintain a higher input signal power level on average.

According to yet another aspect, the method further comprises the step of receiving, in the first signal, a request for transmission power adjustment from the far end transceiver. Consequently, by virtue of the step of receiving requests for transmission power adjustment, the additional benefit of being able to respond to, and thus alleviate, a receiver overload situation at the far end transceiver is obtained. Thus, receiver overload problems at the far end transceiver is alleviated or even eliminated.

According to one aspect, the request for transmission power adjustment comprises a request for reduced transmission power from the far end transceiver. The method then further comprises the step of responding to the received request for reduced transmission power by reducing the transmission power of the transceiver by a pre-configured amount.

Thus, since transmit power is decreased, a decrease in the overall power consumption of the transceiver is obtained, which is a benefit. Also, as noted above, receiver overload problems at the far end transceiver are alleviated or eliminated.

According to a further aspect, the request for transmission power adjustment may also comprise a request for increased transmission power from the far end transceiver. The method then further comprises the step of responding to the received request for increased transmission power by increasing the transmission power of the transceiver by a pre-configured amount, up to a pre-configured maximum transmission power.

By merit of the feature above, sufficient input power is maintained at the far end transceiver, which improves reception conditions and thus improves on the availability of the fixed point-to-point radio link.

According to yet another aspect, the step of transmitting further comprises including, in the second signal, a request to increase transmission power in the far end transceiver when no receiver overload is detected.

Thus, the further advantage of being able to maintain a high transmission signal power at all times, while at the same time avoiding receiver overload, is obtained. This feature simplifies planning of fixed point-to-point radio link networks since radio planning can be done assuming a certain minimum input power at each transceiver at all times, while at the same time neglecting the issue of receiver overload.

The object of mitigating, alleviating, or eliminating one or more of the above-identified deficiencies in the art and disadvantages singly or in any combination and providing improved receiver overload protection for fixed point-to-point radio links is also obtained by a transceiver for a fixed point-to-point radio link. The transceiver comprises a transmit unit arranged to transmit a second signal to a far end transceiver via a transmit port. The transceiver also comprises a receive unit arranged to receive a first signal from the far end transceiver via a receive port. The receive unit comprises a receiver overload detection module arranged to detect receiver overload due to excess power in the first signal. The transceiver also comprises a processor unit arranged to request, via the second signal, a reduced transmission power from the far end transceiver when the receiver overload detection module detects a receiver overload condition of the transceiver due to excess power in the first signal.

According to an aspect, the transmit unit also comprises a transmit power control module arranged to control the transmission power of the transceiver.

According to another aspect, the processor unit is arranged to respond to a received request for reduced transmission power, received via the first signal, from the far end transceiver by reducing, by the transmit power control module, the transmission power of the transceiver by a pre-configured amount.

According to yet another aspect, the processor unit is arranged to respond to a received request for increased transmission power, received via the first signal, from the far end transceiver by increasing, by the transmit power control module, the transmission power of the transceiver by a pre-configured amount, or up to a pre-configured maximum transmission power level, whichever results in the smaller transmission power. The processor unit is also arranged to request, via the second signal, an increased transmission power from the far end transceiver when the receiver overload detection module detects no receiver overload condition of the transceiver due to excess power in the first signal.

According to one aspect, the receiver overload detection module is arranged to measure the power of the received first signal and also to detect receiver overload due to excess power in the received signal based on if the measured power of the first signal is above a pre-configured first signal power threshold.

Problems with nonlinear distortion in a receiver at high input signal power levels due to receiver overload can thus be avoided by the present technique by changing the output power of the far end transmitter when needed. I.e., if the receiver input power is too high, the receiver informs the far-end transmitter to decrease the power accordingly. Thus, by the disclosed transceiver, the use of high power consumption amplifiers and/or complex linearization techniques in the transceiver can be avoided since problems with receiver overload have been alleviated or even eliminated, which is a benefit of the present transceiver.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The transceiver and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
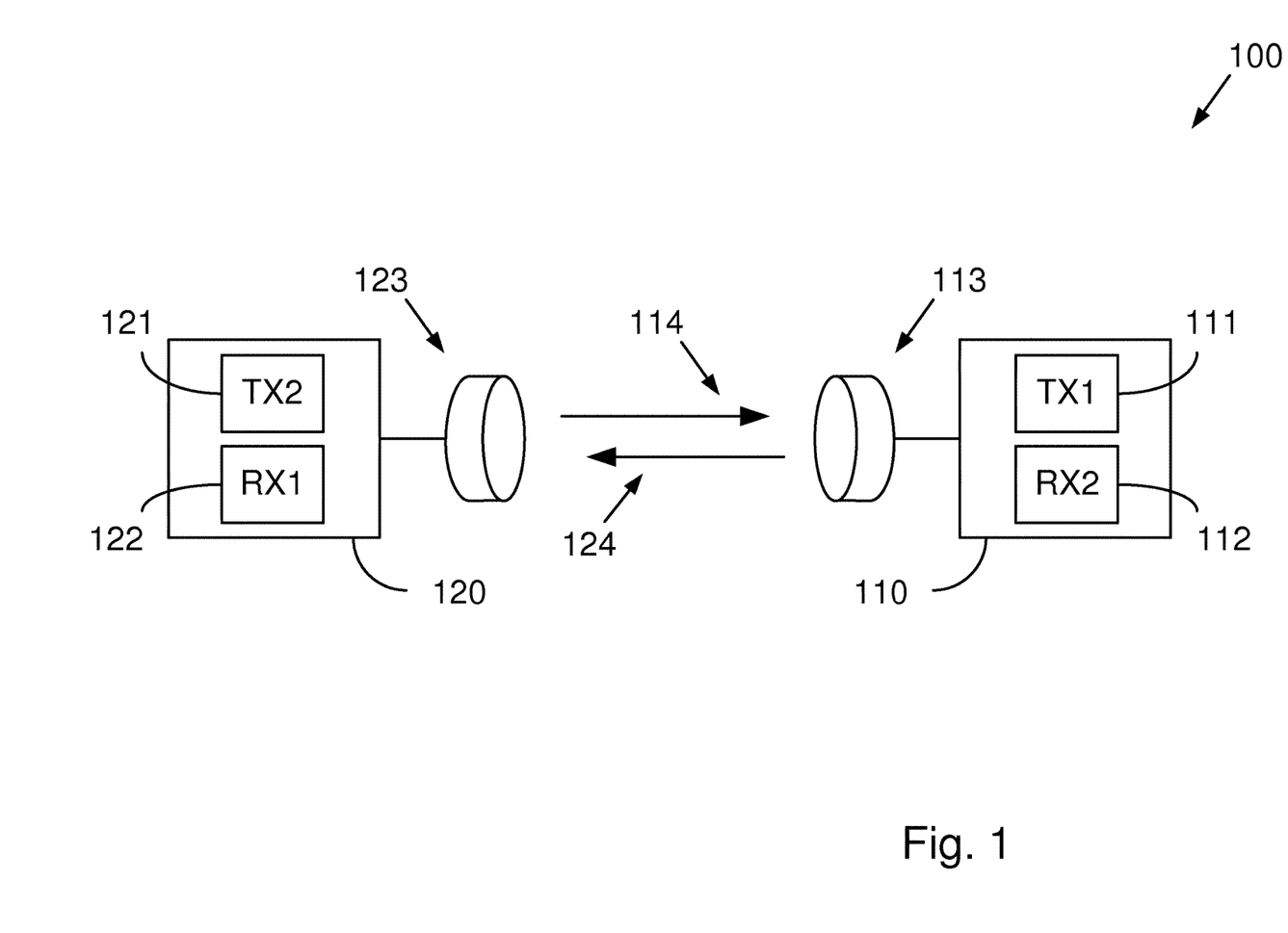
FIG. 1 is a block diagram illustrating embodiments of a fixed point-to-point radio link.

FIG. 1 shows a fixed point-to-point radio link 100. The radio link 100 comprises two transceivers 110, 120, arranged for radio signaling of a first 114 and a second 124 signal, between transceivers 110, 120 using directive antennas 113, 123. Herein, the leftmost transceiver will be referred to as the far end transceiver 120. Each of the transceivers 110, 120, comprises a transmitter 111, 121 and a receiver 112, 122. The transceivers 110, 120 are arranged to communicate with each other using modulated information symbols carried by said radio signaling 114, 124.

Fixed point to point radio links, such as the one shown in FIG. 1, are often deployed in cellular backhaul networks and other similar networks where requirements on availability and communication bit error rates are very strict. Often, the requirement on availability of a radio link deployed in a network for cellular backhaul is 99.999%, 'five nines', meaning that the radio link cannot be out of operation due to, e.g., rain or multipath fading more than 0.001% of the time counted over the year. This results in requirements on large fading margins when planning the deployment of radio links. This is especially true for fixed point-to-point radio links arranged to operate over long distances, e.g., over several tens of kilometers, where a requirement on large fading margin is often a problem.

This requirement on large fading margin will result in very high input power during normal operation conditions, i.e., during clear sky operating conditions, which in turn results in potential receiver overload and challenging design constraints on hardware. For very long distance radio links, the requirement on receiver dynamic range can be on the order of 60 dB, mainly due to said large fading margins. Consequently, if the receiver input signal power threshold is −70 dBm, a receiver overload level on the order of about −10 dBm is necessary, which is challenging to achieve in practice.

Applying the type of receiver overload protection techniques as disclosed herein means that one can lower far end transmitter output power when, e.g., the transceiver input power exceeds a pre-determined value. This can be compared to automatic transmit power control, ATPC. However, a system can be configured in a fix output power mode, which is to-date the most commonly used, and still provide receiver overload protection functionality protecting the receiver by using the method and transceiver disclosed herein. Thus, radio planning and all other aspects, which are usually controlled by standards and regulatory bodies, will comply with a system using the type of receiver overload protection disclosed herein.

The fixed point-to-point radio link transceiver 110 shown in FIG. 1 is according to various aspects part of a multiple transmitter radio link. An example is an N+1 radio link protection scheme which employs transmission at multiple frequencies in order to increase availability of the aggregate radio link. In case the radio link forms part of a larger radio link installation, the increasing and decreasing of transmission power by the transceiver 110 can be accomplished by re-distributing power between the multiple transmitters, as opposed to, e.g., achieving different output levels by connecting different attenuators or by varying the output power of a single transmitter via control of output power circuitry in the transceiver 110.

Consequently, an altering of transmission power of the fixed point-to-point radio link transceiver 110 may according to aspects comprise redistributing transmission power between multiple transmitters to change the transmission power of the fixed point-to-point radio link transceiver 110.

Another way to achieve an alteration of the transmission output power of the fixed point-to-point radio link transceiver 110 is to perform clipping of the transmitted second signal 124, meaning that high peaks in the transmitted waveform are reduced, or 'clipped'.

Consequently, a receiving of a request for reduced transmission power at the fixed point-to-point radio link transceiver 110 from a far end transceiver 120, and responding to the received request for reduced transmission power may according to aspects comprise clipping of the second signal 124 to reduce peak-to-average power ratio, PAPR, of the second signal 124.

There are fixed point-to-point radio link transceivers which implement automatic transmit power control, ATPC. ATPC is a function which dynamically adjusts the transmitted power of a far end transceiver in order to maintain a certain minimum input power level at the receiver. However, ATPC functionality is associated with the drawback of complicating network planning due to uncertainties regarding, e.g., interference conditions in the network. Hence, many networks today implement a fixed power transmission scheme where the output power of a transmitter in the network is configured to be fixed. As will be clear from the present disclosure, the present technique is not to be confused with ATPC, e.g., since it can be applied in a network planned for fixed power transmission.

An advantage of the present technique, then, is that the receiver overload protection scheme disclosed here can be implemented even though the transceivers in the network are configured to transmit at fixed power. Thus, the fixed point-to-point radio link transceiver 110 can according to aspects be configured for fixed power transmission. Also, the fixed point-to-point radio link transceiver 110 can according to aspects be arranged to be deployed in a cellular backhaul network planned for fixed power transmission point-to-point radio links.

Figure 2:
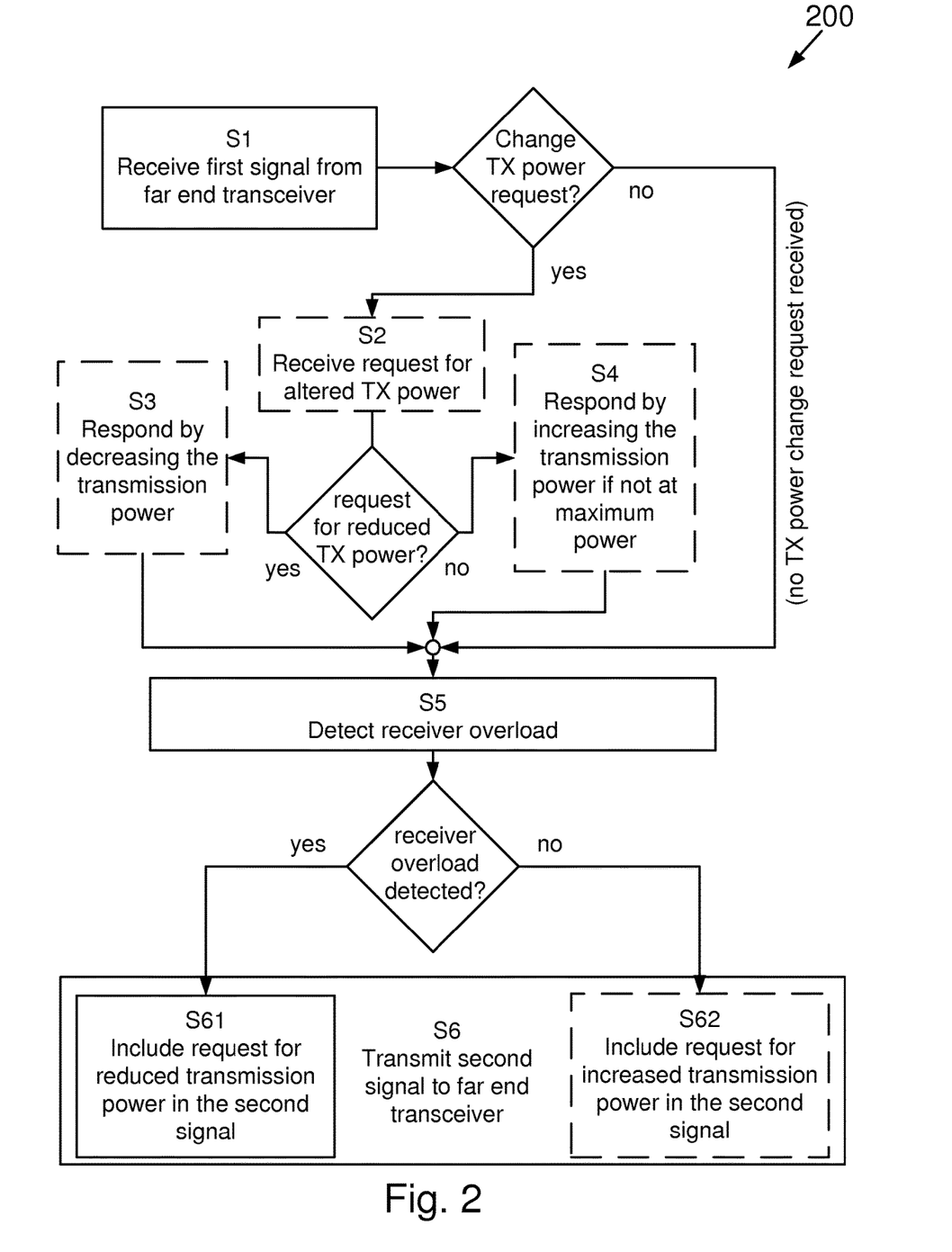
FIGS. 2 and 3 are flowcharts illustrating embodiments of method steps.

FIG. 2 is a flowchart illustrating embodiments of method steps. In particular, FIG. 2 shows a flowchart of a method 200 in a fixed point-to-point radio link transceiver 110. The method 200 comprises the step of receiving S1 a first signal 114 from a far end transceiver 120. This signal is preferably a radio signal arranged to be transmitted in the licensed communication frequency band of the fixed point-to-point radio link 100. However, additional types of signals are possible, examples include sounding signals transmitted outside of the licensed communication frequency band, which are only used for dedicated receiver overload protection purposes.

The method also comprises the step of detecting S5 receiver overload due to excess power in the received first signal 114. Herein, the phrase detecting is according to various aspects to be construed as either indirectly estimating the onset of receiver overload by careful scrutiny of receiver behavior, e.g., by processing an error signal of the transceiver as detailed below, or as predicting the onset of receiver overload prior to an actual onset of overload, again by careful scrutiny of receiver behavior, or simply as determining that receiver overload has occurred.

The method 200 also comprises the step of transmitting S6 a second signal 124 to the far end transceiver 120. The step of transmitting S6 comprises including S61, in the second signal 124, a request to reduce transmission power in the far end transmitter 121 of the far end transceiver 120 when receiver overload is detected.

According to one aspect, the second signal 124 is a modulated communications signal comprising modulated information symbols, e.g., quadrature amplitude modulated, QAM, information symbols, and the request to reduce transmission power is included in the second signal 124 by encoding the request over said information symbols or embedding the request in said information symbols.

According to another aspect the second signal 124 is a framed communications signal comprising a header and a payload, and the request to reduce transmission power is included as information in the header of the second signal 124.

The method 200 disclosed herein can be seen as having two separate and independent parts. On one hand there is the step of receiving S1 the first signal, and detecting S5 receiver overload, and requesting a reduced transmission power from the far end transceiver via the transmitted second signal when receiver overload is detected. On the other hand there is the step of receiving S2 a request comprised in the first signal to alter transmission power, and responding S3, S4 to said request by altering the transmission power accordingly. It should be noted that these two parts are independent of each other, meaning that either part is not dependant on any interaction with the other part of the method, and can be implemented jointly or separately.

The flowchart in FIG. 2 also shows various aspects of the disclosed method 200, as will be detailed below.

According to one such aspect, the method further comprises the step of receiving S2, in the first signal 114, a request for transmission power adjustment from the far end transceiver 120.

This request for transmission power adjustment is included in the first signal 114 by the far end transceiver.

According to another such aspect, the request for transmission power adjustment comprises a request for reduced transmission power from the far end transceiver 120. The method 200 then comprises the step of responding S3 to the received request for reduced transmission power by reducing the transmission power of the transceiver 110 by a pre-configured amount.

This request for transmission power adjustment is included in the first signal 114 by the far end transceiver when the far end transceiver is experiencing high input signal levels and is experiencing, or is close to experiencing, receiver overload. Consequently, the request for transmission power adjustment is not always present in the first signal 114.

According to yet another such aspect, the request for transmission power adjustment comprises a request for increased transmission power from the far end transceiver 120. The method 200 then comprises the step of responding S4 to the received request for increased transmission power by increasing the transmission power of the transceiver 110 by a pre-configured amount, up to a pre-configured maximum transmission power.

This request for transmission power adjustment is included in the first signal 114 by the far end transceiver when the far end transceiver is not experiencing dangerously high input signal levels and is not experiencing receiver overload.

According to an aspect, the pre-configured maximum transmission power is a pre-configured transmission power of a fixed point-to-point radio link. Thus the step of responding S4 to the received request for increased transmission power by increasing the transmission power of the transceiver 110 by a pre-configured amount, comprises increasing the transmission power back to a pre-configured transmission power.

According to a further such aspect, the step of transmitting S6 further comprises including S62 in the second signal a request to increase transmission power in the far end transceiver 120 when no receiver overload is detected.

Figure 3:
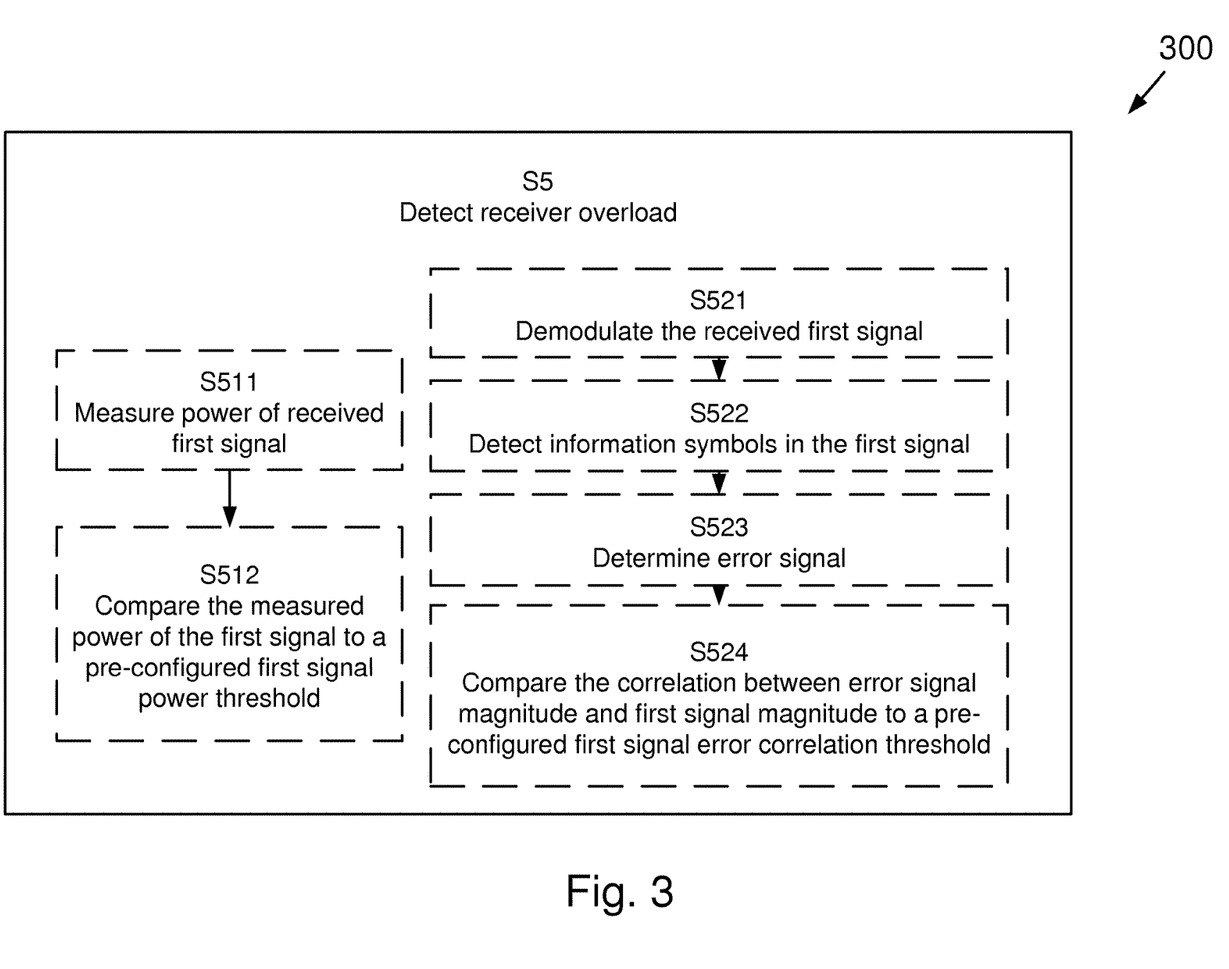

FIG. 3 is a flowchart illustrating embodiments of method steps, in particular FIG. 3 shows a flowchart of aspects of the disclosed method 300, and in particular aspects of the step of detecting S5 receiver overload due to excess power in the received first signal 114. Here the step of detecting S5 comprises measuring S511 the power of the received first signal 114 and also comparing S512 the measured power of the first signal 114 to a pre-configured first signal power threshold.

This aspect of the step of detecting S5 brings the advantage of being of low complexity, as the comparison between a measured, or indirectly determined, power of the first signal 114 to a pre-configured first signal power threshold can be done without need for complex processing modules or excessive consumption of processing power.

FIG. 3 also shows a flowchart of another aspect of the disclosed method 300. Here the step of detecting S5 comprises demodulating S521 the received first signal 114 followed by detecting S522 modulated information symbols comprised in the first signal 114, and also determining S523 an error signal. The error signal is determined as the difference between demodulated information symbols and corresponding samples of the received and demodulated first signal.

The method 300 also comprises the step of comparing S524 the correlation between the magnitude of the error signal and the magnitude of the first signal to a pre-determined first signal error correlation threshold.

In a preferred implementation of the aspects described above, effects of the propagation channel between the fixed point-to-point radio link transceiver 110 and the far end transceiver 120, e.g., multipath fading is compensated for by the receiver 122. This often entails having implemented some form of equalization function between receive antenna and demodulation and detection of information symbols, and thus also generation of the error signal. These types of functions are preferably compensated for in the error signal before using the error signal for detection of receiver overload, and various correlations involving the error signal, as basis for the step of detection S6. Such compensation comprises inverting the function of an equalizer in order to compensate for the equalizer effect on the received signal.

Figure 4:
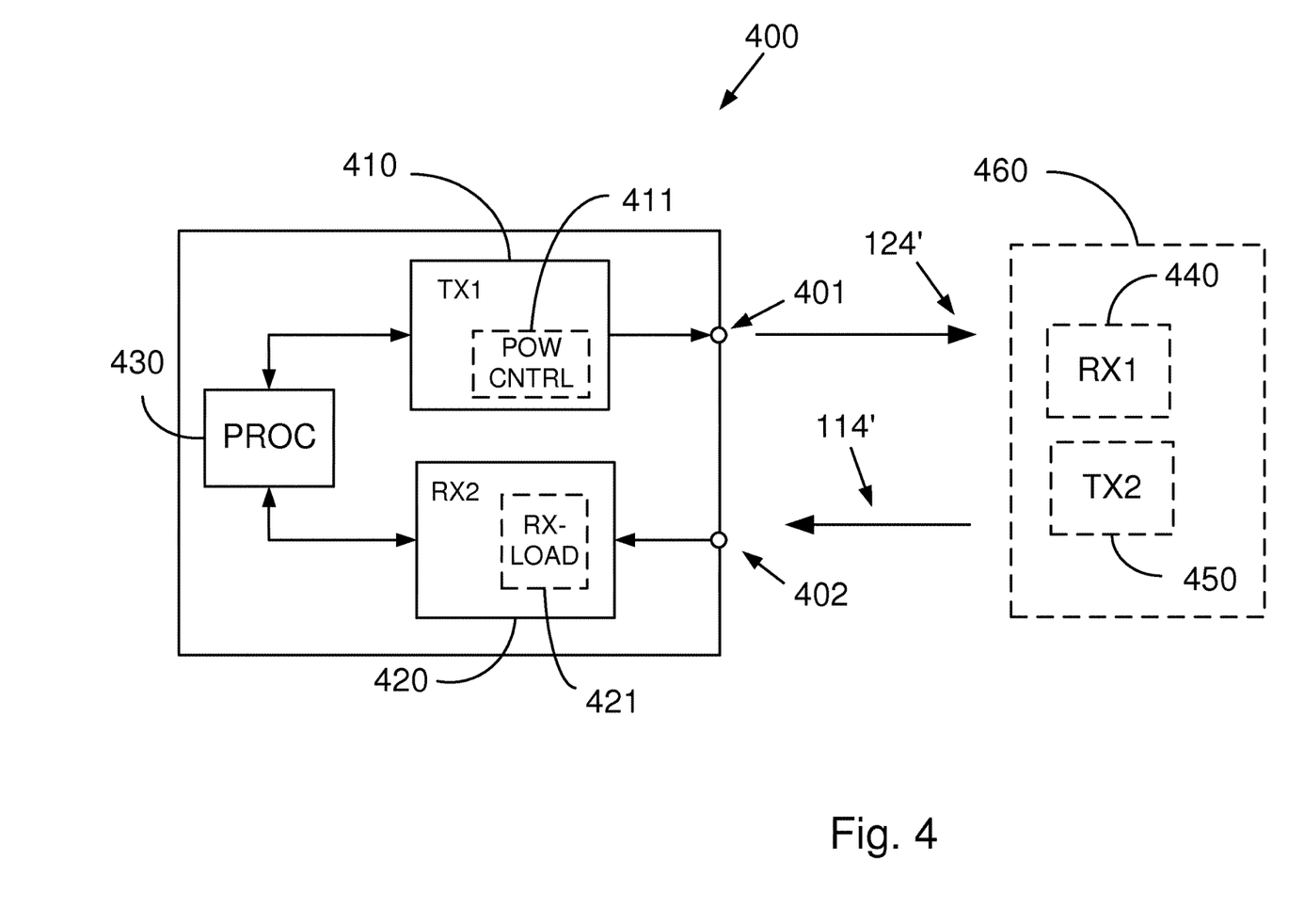
FIG. 4 is a block diagram illustrating embodiments of a fixed point-to-point radio link.

It is noted in FIG. 3 and FIG. 4 that many sources of information are available in the step of detecting S5 receiver overload. A preferred implementation makes use of a combination of these sources, and performs the actual classification of receiver overload condition based on a weighted combination of said information sources. The weights of this weighted combination is preferably optimized by computer simulation or lab experimentation.

Said pre-configured thresholds used in the step of detecting S5 are preferably pre-determined by experimentation in lab, or from computer simulation, or based on transceiver hardware specification, i.e., saturation levels of components of the receiver 112.

FIG. 4 is a block diagram illustrating embodiments of a fixed point-to-point radio link. In particular, FIG. 4 shows a transceiver 400 for a fixed point-to-point radio link. The transceiver 400 comprises a transmit unit 410 arranged to transmit a second signal 124' to a far end transceiver 460 via a transmit port 401. In a preferred implementation, the transmitted second signal 124' is limited in frequency bandwidth, and arranged to be transmitted in a band limited channel defined by a transmission license.

The far end transceiver 460 shown in FIG. 4 comprises a transmit unit 450 and a receive unit 440.

The transceiver 400 also comprises a receive unit 420 arranged to receive a first signal 114' from the far end transceiver 460 via a receive port 402. The receive unit 420 comprises a receiver overload detection module 421 arranged to detect receiver overload due to excess power in the first signal 114'. As noted above, detection of receiver overload by the receiver overload detection module is to be construed according to alternatives as either indirectly estimating the onset of receiver overload by careful scrutiny of receiver behavior, e.g., by processing an error signal of the transceiver, or as predicting the onset of receiver overload prior to an actual onset of overload, again by careful scrutiny of receiver behavior, or simply as determining that receiver overload has in fact already occurred.

The transceiver 400 also comprises a processor unit 430 arranged to request, via the second signal 124', a reduced transmission power from the far end transceiver 460 when the receiver overload detection module 421 detects a receiver overload condition of the transceiver 400 due to excess power in the first signal 114'.

The transmit unit 410 shown in FIG. 4 also comprises a transmit power control module 411 arranged to control the transmission power of the transceiver 400. Thus, by the transmit power control module 411, the transceiver is able to alter transmission power and in this way respond to requests of altering transmission power, which is a benefit of the present transceiver 400.

The processor unit 430 shown in FIG. 4 is arranged to respond to a received request for reduced transmission power, received via the first signal 114', from the far end transceiver 460 by reducing, by the transmit power control module 411, the transmission power of the transceiver 400 by a pre-configured amount.

The processor unit 430 is also arranged to respond to a received request for increased transmission power, received via the first signal 114', from the far end transceiver 460 by increasing, by the transmit power control module 411, the transmission power of the transceiver 400 by a pre-configured amount, or up to a pre-configured maximum transmission power level, whichever results in the smaller transmission power.

The processor unit 430 is also arranged to request, via the second signal 124', an increased transmission power from the far end transceiver 460 when the receiver overload detection module 421 detects no receiver overload condition of the transceiver 400 due to excess power in the first signal 114'.

The receiver overload detection module 421 is arranged to measure the power of the received first signal 114' and also to detect receiver overload due to excess power in the received signal 114' based on if the measured power of the first signal 114' is above a pre-configured first signal power threshold.

According to an aspect, power is measured by using a square-law detector.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method in a fixed point-to-point radio link transceiver, the method comprising the steps of
receiving a first signal from a far end transceiver,
measuring a power associated with the received first signal from the far end receiver,
detecting receiver overload due to excess power in the received first signal, the overload detected based on the measured power associated with the received first signal from the far end receiver exceeding a pre-configured first signal power threshold, transmitting a second signal to the far end transceiver, the step of transmitting comprising including, in the second signal, a request to reduce transmission power in the far end transceiver when receiver overload is detected.

2. The method according to claim 1, wherein the step of detecting comprises demodulating the received first signal detecting modulated information symbols comprised in the first signal, and determining an error signal, the error signal being determined as the difference between demodulated information symbols and corresponding samples of the received and demodulated first signal, as well as comparing the correlation between the magnitude of the error signal and the magnitude of the first signal to a pre-determined first signal error correlation threshold.

3. The method according to claim 1, further comprising the step of receiving, in the first signal, a request for transmission power adjustment from the far end transceiver.

4. The method according to claim 3, wherein the request for transmission power adjustment comprises a request for reduced transmission power from the far end transceiver, and further comprising the step of responding to the received request for reduced transmission power by reducing the transmission power of the transceiver by a pre-configured amount.

5. The method according to claim 4, wherein the receiving a request for reduced transmission power from the far end transceiver and responding to the received request for reduced transmission power comprises clipping of the second signal to reduce peak-to-average power ratio, PAPR, of the second signal.

6. The method according to claim 3, wherein the request for transmission power adjustment comprises a request for increased transmission power from the far end transceiver, and further comprising the step of responding to the received request for increased transmission power by increasing the transmission power of the transceiver by a pre-configured amount, up to a pre-configured maximum transmission power.

7. The method according to claim 1, the step of transmitting further comprising including in the second signal a request to increase transmission power in the far end transceiver when no receiver overload is detected.

8. The method according to claim 1, the fixed point-to-point radio link transceiver being part of a multiple transmitter radio link, the reducing of transmission power comprising redistributing transmission power between said multiple transmitters to change the transmission power of the fixed point-to-point radio link transceiver.

9. The method according to claim 1, wherein the fixed point-to-point radio link transceiver is configured for fixed power transmission.

10. The method according claim 1, wherein the fixed point-to-point radio link transceiver is arranged to be deployed in a backhaul network planned for fixed power transmission point-to-point radio links.

11. A transceiver for a fixed point-to-point radio link, the transceiver comprising a transmit unit arranged to transmit a second signal to a far end transceiver via a transmit port, a receive unit arranged to receive a first signal from the far end transceiver via a receive port, the receive unit comprising a receiver overload detection module arranged to:

measure a power of the received first signal from the far end receiver, and detect receiver overload due to excess power in the first signal, the overload detected based on the measured power associated with the received first signal from the far end receiver exceeding a pre-configured first signal power threshold, a processor unit arranged to request, via the second signal, a reduced transmission power from the far end transceiver when the receiver overload detection module detects a receiver overload condition of the transceiver due to excess power in the first signal.

12. The transceiver according to claim 11, wherein the transmit unit comprises a transmit power control module arranged to control the transmission power of the transceiver.

13. The transceiver according to claim 12, the processor unit being arranged to respond to a received request for reduced transmission power, received via the first signal, from the far end transceiver by reducing, by the transmit power control module, the transmission power of the transceiver by a pre-configured amount.

14. The transceiver according to claim 12, the processor unit being arranged to respond to a received request for increased transmission power, received via the first signal, from the far end transceiver by increasing, by the transmit power control module, the transmission power of the transceiver by a pre-configured amount, or up to a pre-configured maximum transmission power level, whichever results in the smaller transmission power, the processor unit further being arranged to request, via the second signal, an increased transmission power from the far end transceiver when the receiver overload detection module detects no receiver overload condition of the transceiver due to excess power in the first signal.

* * * * *